(12) United States Patent
Fung et al.

(10) Patent No.: US 9,754,348 B2
(45) Date of Patent: *Sep. 5, 2017

(54) AUTOMATED MULTI-FACTOR PRIORITIZATION AND VISUALIZATION

(71) Applicant: Blue Goji Corp., Austin, TX (US)

(72) Inventors: Coleman Fung, Spicewood, TX (US); Blake L Lowry, Dripping Springs, TX (US); John E Schrock, Austin, TX (US)

(73) Assignee: BLUE GOJI LLC, Dover, DE (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/751,122

(22) Filed: Jun. 25, 2015

(65) Prior Publication Data

US 2016/0358310 A1 Dec. 8, 2016

Related U.S. Application Data

(63) Continuation-in-part of application No. 14/733,911, filed on Jun. 8, 2015.

(51) Int. Cl.
*G06T 3/40* (2006.01)
*G09G 5/14* (2006.01)
*H04N 21/431* (2011.01)

(52) U.S. Cl.
CPC .............. *G06T 3/40* (2013.01); *G06T 3/4092* (2013.01); *G09G 5/14* (2013.01); *G09G 2340/04* (2013.01)

(58) Field of Classification Search
None
See application file for complete search history.

(56) References Cited

U.S. PATENT DOCUMENTS

| 8,635,087 B1 | 1/2014 | Igoe et al. | |
|---|---|---|---|
| 2015/0220883 A1* | 8/2015 | B'Far | G06Q 10/105 700/91 |
| 2016/0162601 A1* | 6/2016 | Wohlert | G06F 3/04847 707/748 |

FOREIGN PATENT DOCUMENTS

WO 2005025115 A2 3/2005

* cited by examiner

*Primary Examiner* — Kee M Tung
*Assistant Examiner* — Yanna Wu
(74) *Attorney, Agent, or Firm* — Galvin Patent Law LLC; Brian R. Galvin

(57) ABSTRACT

A system for user activity and data aggregation and visualization, comprising a data aggregation server that receives data via a network, a prioritization server that ranks data, and a visualization engine that generates a visualization of ranked data using a planetary model, and a method for visualizing data using a planetary model.

8 Claims, 14 Drawing Sheets

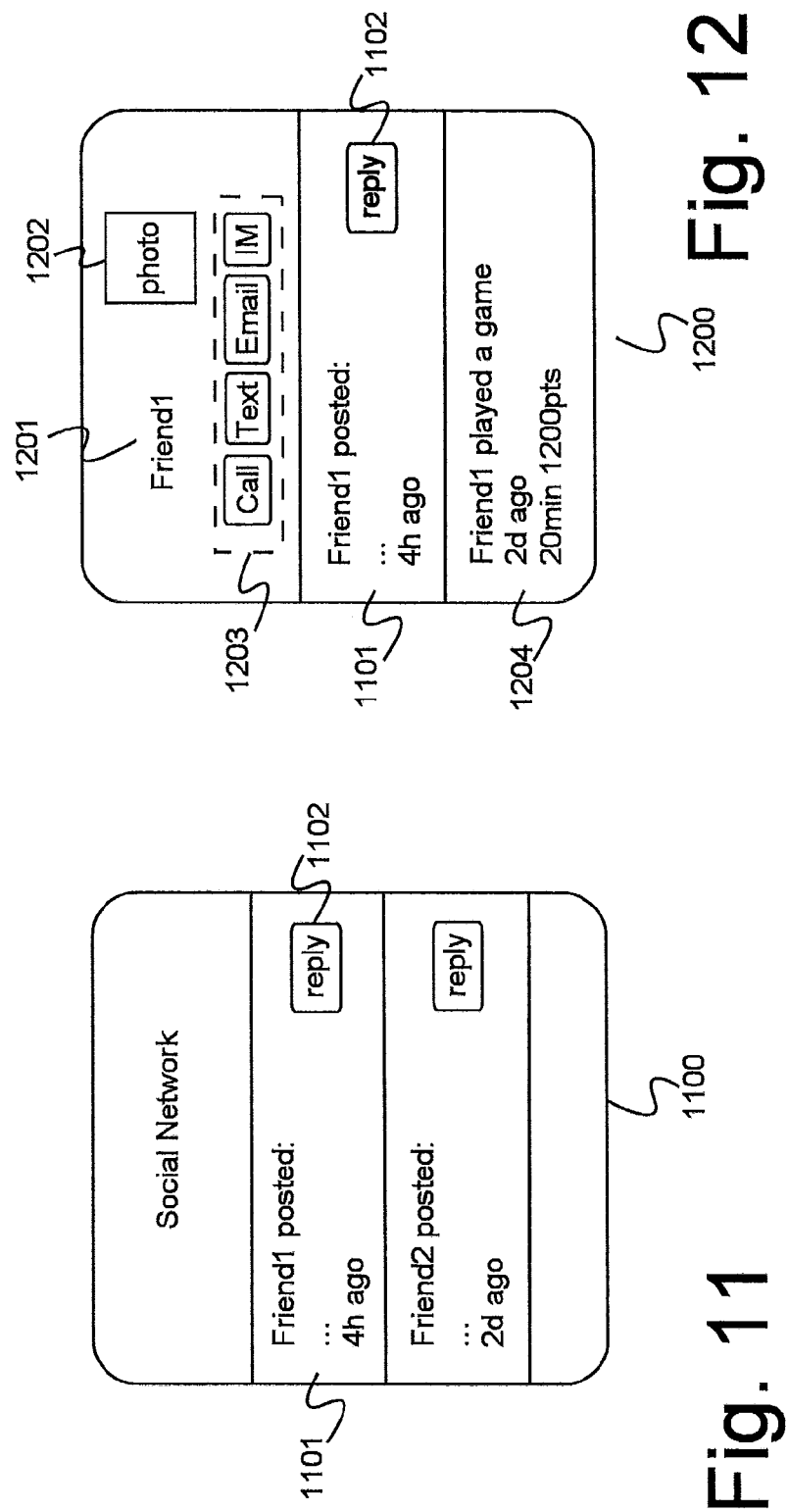

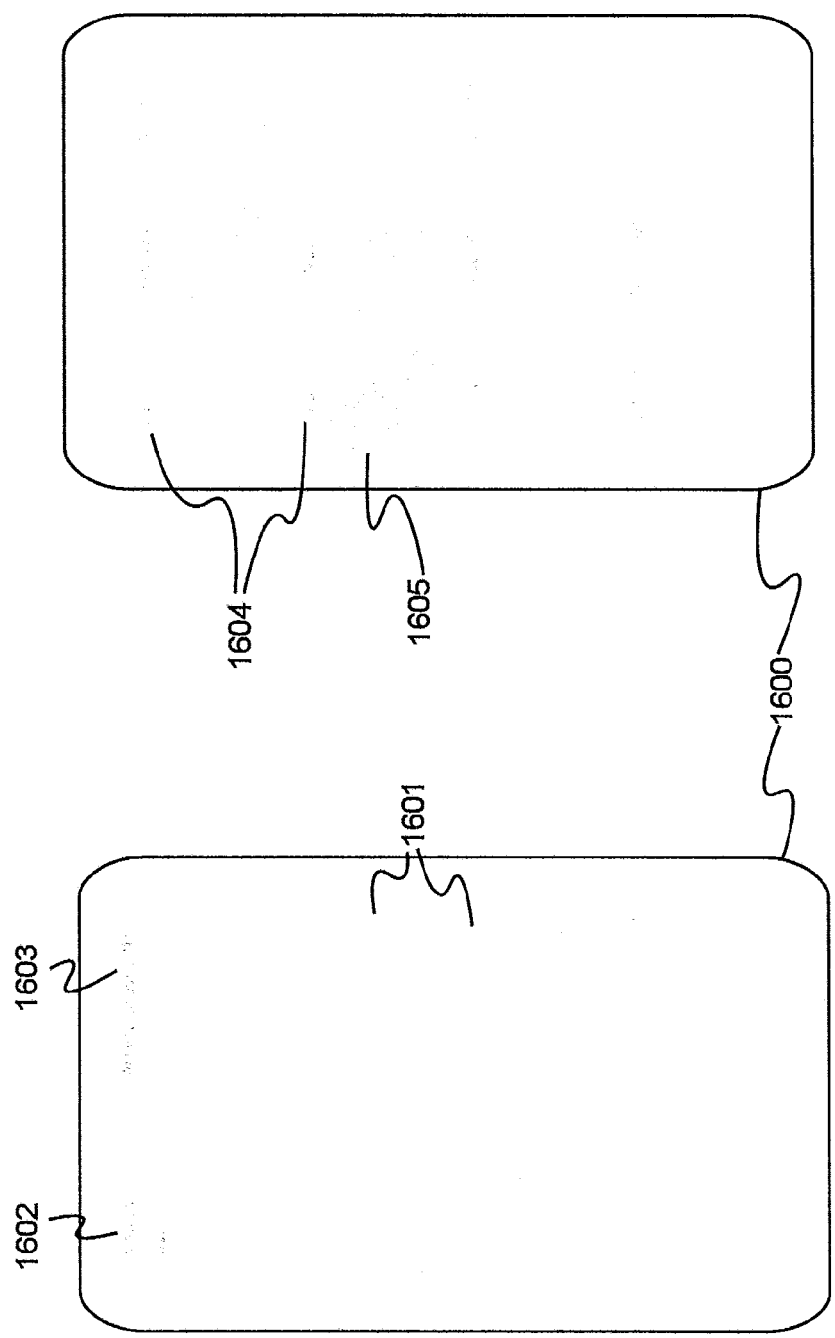

AUTOMATED MULTI-FACTOR PRIORITIZATION AND VISUALIZATION

CROSS-REFERENCE TO RELATED APPLICATIONS

The present application is a continuation-in-part of U.S. patent application Ser. No. 14/733,911, titled "MULTI-FACTOR PRIORITIZATION AND VISUALIZATION TOOL" and filed on Jun. 8, 2015, the entire specification of which is incorporated herein by reference in its entirety.

BACKGROUND OF THE INVENTION

Field of the Art

The disclosure relates to the field of data visualization, and more particularly to the field of aggregating and visualizing user information and activities on an electronic device.

Discussion of the State of the Art

In mobile computing, there is a growing interest in aggregation of user activity and personal data, in what is termed the "quantified self". Users increasingly want to be able to track or summarize their activities in software apps or social networks, as well as track fitness, health, or other personal data. Often, a user will use multiple products each with a separate "hub" or central summary that may integrate with some of their information, requiring the use of more than one service to adequately view all of their information. This creates confusion and duplicate data, and complicates the process of summarization, a primary intent of which is to make information convenient and accessible. Additionally, users often want to incorporate a social element to their data monitoring, such as to share data with contacts or find others for group activities such as games or fitness events. A further need when collecting and presenting large amounts of information, is the prioritization of information so that more immediately relevant or important information may be readily accessible.

Present information interfaces in the art generally rely on either a tile-based or list-based visual arrangement of information, which is suitable for presenting information in an ordered fashion but is inefficient overall. Such arrangements require a minimum amount of screen area to adequately present information while making the larger structure or direction of the interface clear. To view additional information, a user must interact with the interface to scroll, flip, or otherwise advance a display to view further tiles or list items. These requirements may cause complications as screens become smaller, for example in mobile smartphones or wearable electronics, where screen space is at a premium and an emphasis is placed on economizing presentation of information to a user.

What is needed is a means to aggregate data from a variety of sources including apps, health and fitness trackers, contacts, and social network accounts, and to visualize aggregated information in a manner that is easy to view and understand and that indicates information priority or importance.

SUMMARY OF THE INVENTION

Accordingly, the inventor has conceived and reduced to practice, in a preferred embodiment of the invention, a system and method for automated multifactor prioritization and visualization, that is suitable for aggregating data from a wide variety of sources and visualizing data in a prioritized manner that is space-efficient (suitable for viewing on small screens) and rapidly-understood (suitable for viewing in quick glances).

According to a preferred embodiment of the invention, A system for automated multifactor prioritization and visualization, comprising a computing device comprising at least a memory and a processor and connected to a packet-based data network, a data aggregation server software module stored in the memory of, and operating on the processor of, the computing device, a plurality of communication adapter software modules stored in the memory of, and operating on the processor of, the computing device, a prioritization server software module stored in the memory of, and operating on the processor of, the computing device, and a visualization engine software module stored in the memory of, and operating on the processor of, the computing device, is disclosed. According to the embodiment, a first communication adapter software module is configured to receive data elements via the data network from a first plurality of data sources in a first protocol and passes the received data elements to the data aggregation server software module in a standard format different from the first protocol; a second communication adapter software module is configured to receive time-stamped data elements via the data network from a second plurality of data sources in a second protocol and passes the received data elements to the data aggregation server software module in the standard format which is also different from the second protocol; the data aggregation server software module generates a first aggregate comprising all received data elements pertaining to a first object and generates a second aggregate comprising all received data elements pertaining to a second object; the prioritization server software module computes, using the first aggregate, a first plurality of indicia each pertaining to a specific relationship between the first object and a third object and computes, using the second aggregate, a second plurality of indicia each pertaining to a specific relationship between the second object and the third object; and the visualization engine software module computes a distance measure from the third object to the first object based on a first indicia drawn from the first plurality of indicia, computes a size measure for the first object based on a second indicia drawn from the first plurality of indicia, and determines a visual attribute for the first object based on a third indicia drawn from the first plurality of indicia; the visualization engine software module computes a distance measure from the third object to the second object based on a first indicia drawn from the second plurality of indicia, computes a size measure for the second object based on a second indicia drawn from the second plurality of indicia, and determines a visual attribute for the second object based on a third indicia drawn from the second plurality of indicia; and the visualization engine sends, via a third communication adapter software module and the data network, the distance measure and size measure and visual attribute of the first object and the distance measure and size measure and visual attribute of the second object to a client visualization application.

In another preferred embodiment, a method for visualizing aggregated user data according to a planetary model, comprising the steps of: receiving, at a first communication adapter software module stored in the memory of, and operating on the processor of, a computing device, a plurality of data elements via a data network from a first plurality of data sources in a first protocol; providing the received data elements to a data aggregation server software module software module stored in the memory of, and operating on the processor of, the computing device in a standard format different from the first protocol; receiving, at a second communication adapter software module stored in the memory of, and operating on the processor of, the computing device, a plurality of time-stamped data elements via a data network from a second plurality of data sources in a second protocol; providing the received data elements to the data aggregation server software module in the standard format which is also different from the second protocol; generating, at the data aggregation server software module, a first aggregate comprising all received data elements pertaining to a first object; generating a second aggregate comprising all received data elements pertaining to a second object; computing, at a prioritization server software module stored in the memory of, and operating on the processor of, the computing device, using the first aggregate, a first plurality of indicia each pertaining to a specific relationship between the first object and a third object; computing, using the second aggregate, a second plurality of indicia each pertaining to a specific relationship between the second object and the third object; computing, at a visualization engine software module stored in the memory of, and operating on the processor of, the computing device, a distance measure from the third object to the first object based on a first indicia drawn from the first plurality of indicia; computing a size measure for the first object based on a second indicia drawn from the first plurality of indicia; determining a visual attribute for the first object based on a third indicia drawn from the first plurality of indicia; computing a distance measure from the third object to the second object based on a first indicia drawn from the second plurality of indicia; computing a size measure for the second object based on a second indicia drawn from the second plurality of indicia; determining a visual attribute for the second object based on a third indicia drawn from the second plurality of indicia; and sending, via a third communication adapter software module stored in the memory of, and operating on the processor of, the computing device, and via the data network, the distance measure and size measure and visual attribute of the first object and the distance measure and size measure and visual attribute of the second object to a client visualization application, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 11 is an illustration of an exemplary graphical interface for viewing social network information.

FIG. 12 is an illustration of an exemplary graphical interface for viewing contact information.

FIG. 16A illustrates a calendar view that may be utilized to view information by day.

FIG. 16B illustrates a calendar view that may be utilized to view information by month.

DETAILED DESCRIPTION

Figure 1:
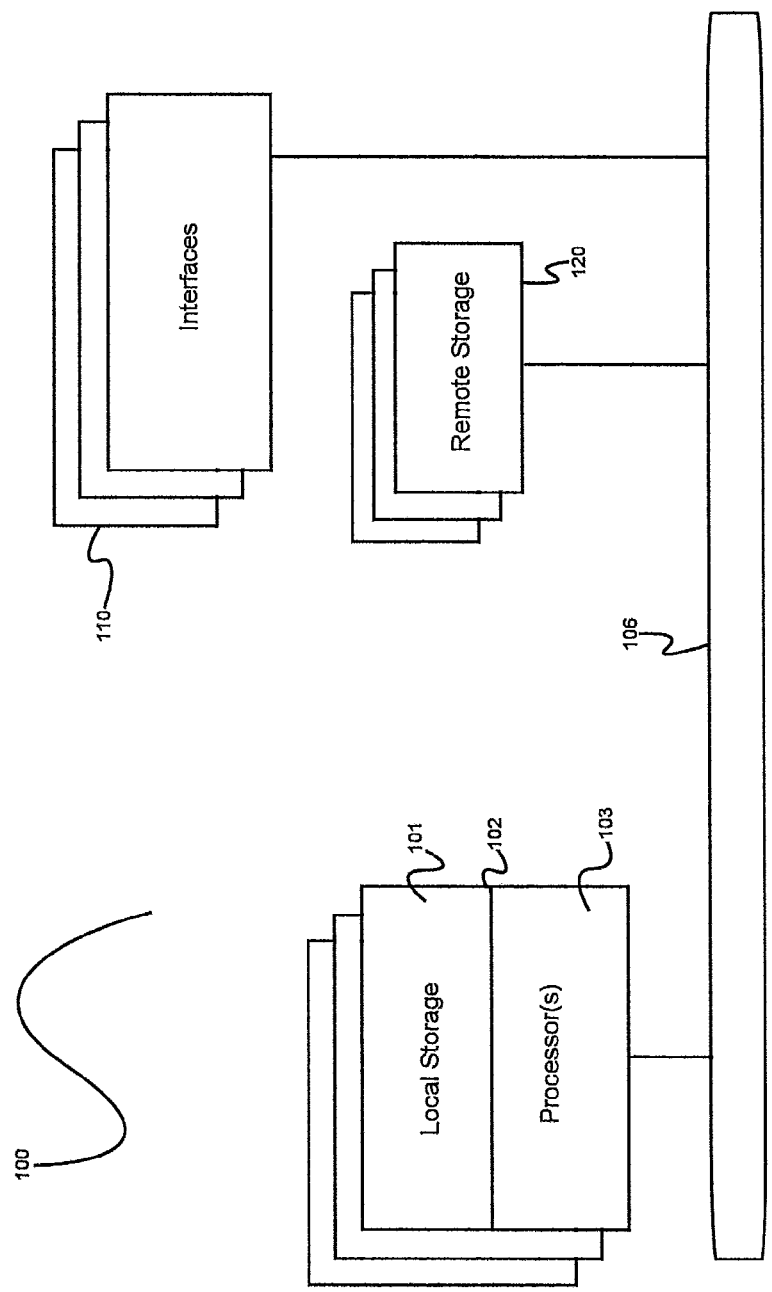
FIG. 1 is a block diagram illustrating an exemplary hardware architecture of a computing device used in an embodiment of the invention.

The inventor has conceived and reduced to practice, in a preferred embodiment of the invention, a system and method for automated multifactor prioritization and visualization, that is suitable for aggregating data form a wide variety of sources and visualizing data in a prioritized manner that is space-efficient (suitable for viewing on small screens) and rapidly-understood (suitable for viewing in quick glances).

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
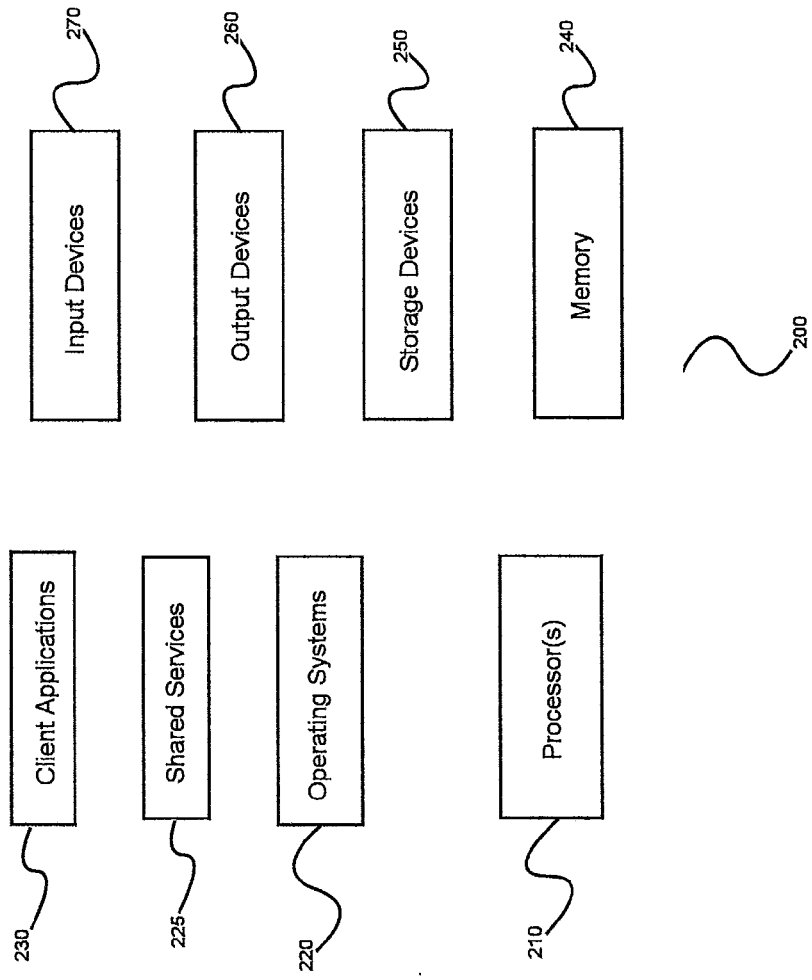
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
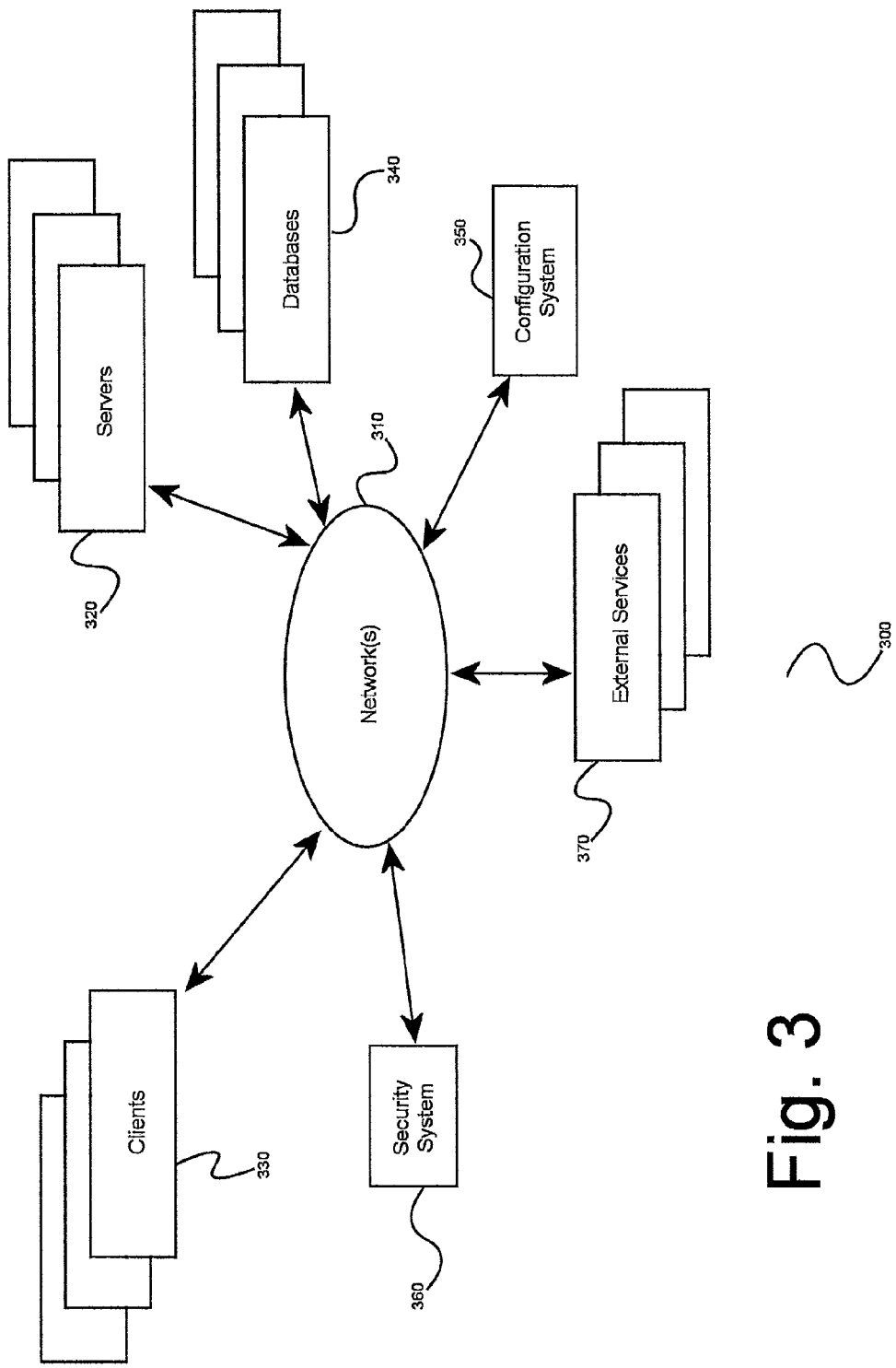
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
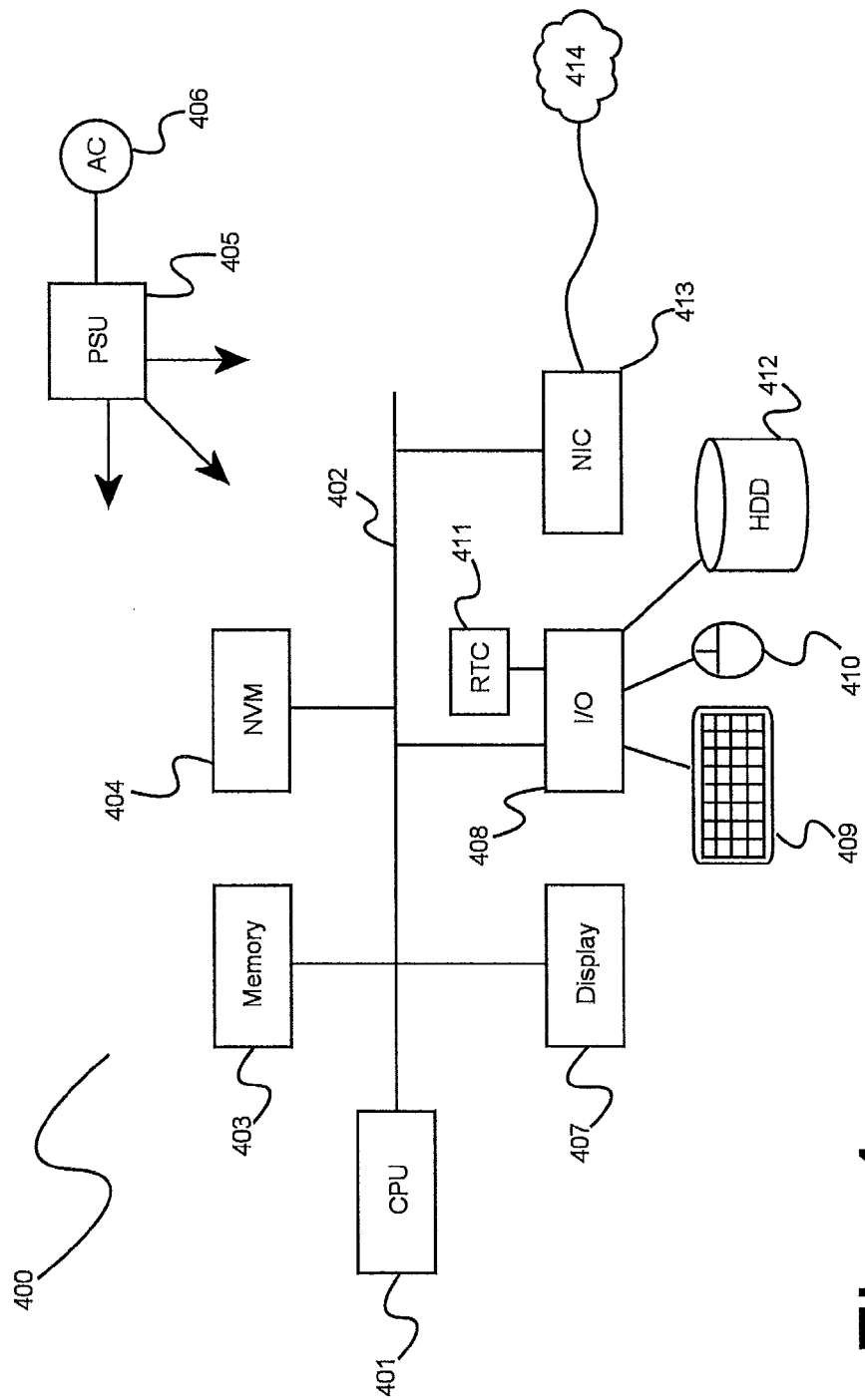
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
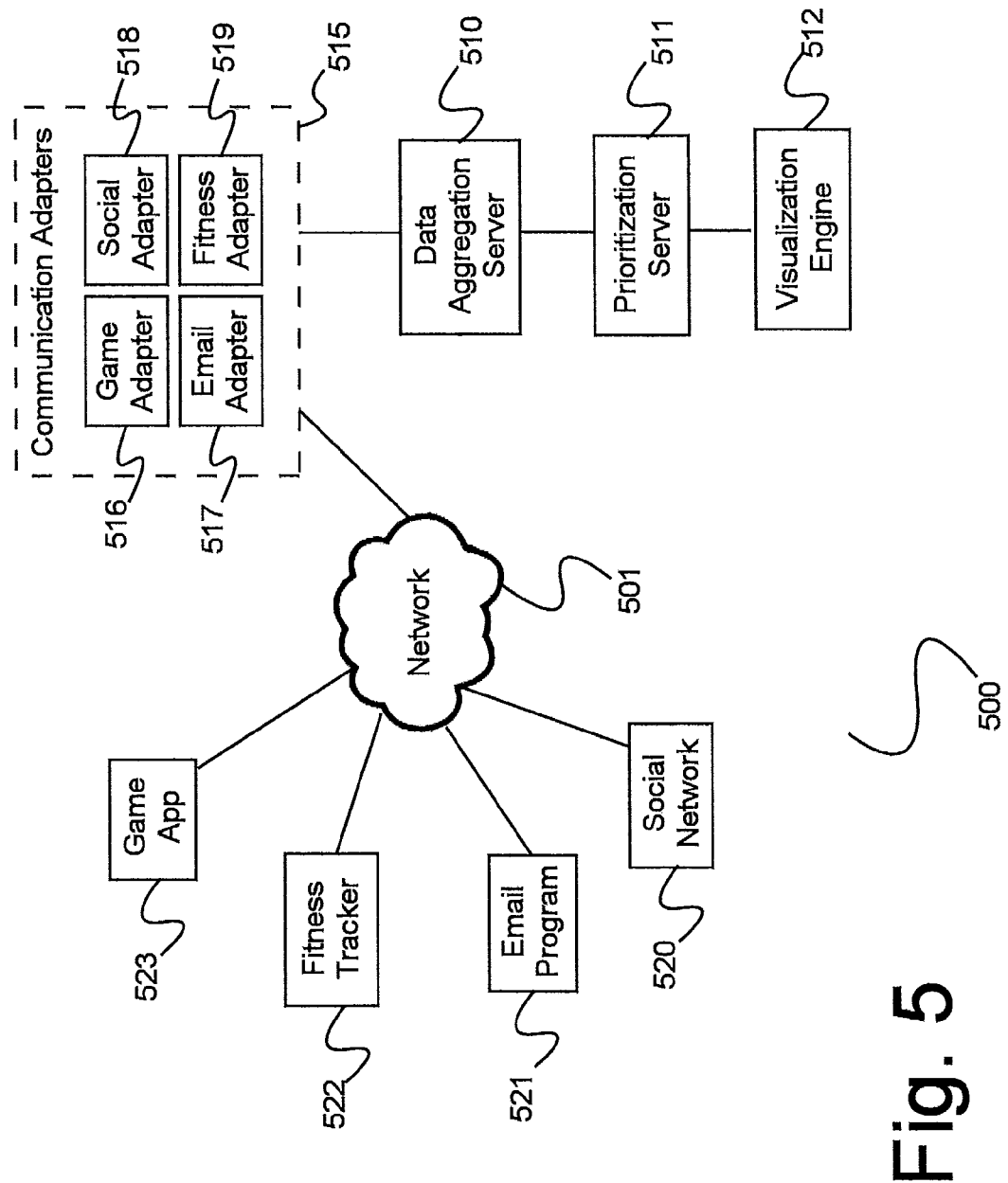
FIG. 5 is a block diagram, illustrating an exemplary system architecture for automated multifactor prioritization and visualization.

FIG. 5 is a block diagram, illustrating an exemplary system architecture 500 for automated multifactor prioritization and visualization.

According to the embodiment, data may be received from a variety of data sources, such as including (for example) a social network 520 (such as TWITTER™, LINKEDIN™, FACEBOOK™, or other social network service), an email program 521 (or any other communication software application or connected hardware device, such as SMS or instant message applications or a hardware telephone), a connected fitness tracker 522 (such as a FITBIT™ or an integral fitness tracking component of a user's device, for example a hardware accelerometer adapted to track steps or other physical activity), or a game 523 or other software application, such as an online application or software operating on a user's device. It should be appreciated that described data sources are exemplary, and a wide variety of sources may be utilized according to the invention in any arrangement or combination according to a user's particular arrangement or use.

A plurality of communication adapters 515 may be utilized to facilitate general or specialized communication between various data sources and data aggregation server 510 according to a particular arrangement. According to the embodiment, a first communication adapter 515 may be configured to receive a plurality of data elements via the data network from a first plurality of data sources in a first protocol, such as an IP protocol. The first communication adapter 515 may then pass the received data elements to data aggregation server 510 in a standard format different from the first protocol, for example an XML-based or other standardized format.

According to the embodiment, a second communication adapter 515 may be configured to receive a plurality of time-stamped data elements via the data network from a second plurality of data sources in a second protocol. The first communication adapter 515 may then pass the received data elements to data aggregation server 510 in a standard format different from the second protocol.

According to the embodiment, a game adapter 516 may receive a plurality of game information from gaming devices (the first plurality of data sources). Game data may include (for example) user account information, game session information (for example, when a game was played or for how long), or game-specific information or metrics, such as "gold pieces collected" (for example). This data may be received by game adapter 516 in a first protocol, such as an IP protocol, and may then be provided to data aggregation server 510 in a standard format different from the first protocol, such as (for example) an XML-based data encoding standard used to encode data for use by different components in a standardized manner. An email adapter 517 may receive time-stamped email information such as email addresses or account information, mailbox configurations, contacts, message history, or other email communication or configuration information. A social adapter 518 may be used to receive and process data from a specific social networking service, such as FACEBOOK™ (for example), such as user account information, contacts or "friends" within a social network, activity history such as postings or comments, or media uploads such as photos or videos. A fitness adapter 519 may be used to receive and process data from a fitness or health tracker such as (for example) a FITBIT™ hardware fitness monitor, or software application, such as (for example) Apple HEALTHKIT™ software applications. Communication adapters 515 may comprise software application programming interfaces (API), or specialized hardware modules (such as to process data using hardware-based encryption, for example), or may be software applications adapted to facilitate communication. For example, an API may be utilized as a social adapter 518 to integrate with particular social networks (such as FACEBOOK™ or TWITTER™, for example) to receive user account information, postings, or other data and to process received data according to its source. It may be generally understood that data from various sources may differ in various aspects, for example in formatting or encoding. By utilizing a plurality of communication adapters 515 according to the embodiment, data may be received from a wide variety of sources and provided to data aggregation server 510 in a unified manner, providing a consistent user experience and ensuring data integrity.

According to the particular nature of a data source as described previously, data received may vary. For example, data from social network 520 may comprise a variety of user-related information such as account information, contacts, or recent activity. Data from an email 521 or other communication application may include recent messages, contacts or other communication data that may be relevant to a user, data from fitness tracker 522 may include recent activity such as workouts, daily activity summary, or health information such as current heart rate, and data from a game 523 or other application may include a variety of user account information, activity, or contacts (such as other users playing the same game).

According to the embodiment, a data aggregation server 510 may comprise at least a plurality of programming instructions stored in a memory operating on a network-connected computing device and configured to receive a plurality of data via a network 501. Network 501 may be the Internet or any suitable data communication network for conveying electronic information between hardware devices or software applications, including for example an internal network within a user's device for conveying information between software applications or hardware components operating on the device (such as between data aggregation server 510 and a plurality of communication adapters 515 operating on the device). According to the embodiment, data aggregation server 510 may generate a first aggregate comprising all received data elements pertaining to a first object (for example, game data pertaining to a data object representing a software gaming application) and may also generate a second aggregate comprising all received data elements pertaining to a second object (for example, social network activity pertaining to a data object representing a particular social network user account).

Data received by data aggregation server 510 and aggregates produced by data aggregation server 510 may be provided to a prioritization server 511, that may compute, using the first aggregate, a first plurality of indicia each pertaining to a specific relationship between the first object and a third object and may also compute, using the second aggregate, a second plurality of indicia each pertaining to a specific relationship between the second object and the third object. For example, an aggregate may comprise a plurality of indicia pertaining to a relationship between a gaming application and a user's account information on a gaming service (such as, for example, XBOX LIVE™ or other gaming services), or a relationship between a particular client account and a portfolio comprising many accounts (such as in a CRM arrangement, as described below).

In the computation of aggregates by prioritization server 511, a variety of ranking operations may be performed based on received data. Ranking may be used to determine relative "relevance" or similar metadata that may be associated with portions of received data according to a particular use, such as to sort received data according to recentness. For example, a plurality of email messages from a user's configured email account may be ranked according to when they were received, or workouts logged by a fitness tracker may be ranked according to when they took place. In this manner a large portion of data may be easily organized and prioritized to enable more relevant information to be made more accessible, making large bodies of information more "actionable" as relevant information may be given higher precedence over information that may be less likely to be needed for viewing or taking action.

According to the embodiment, a visualization engine 512 may compute a distance measure from the third object to the first object based on a first indicia drawn from the first plurality of indicia, and may also compute a size measure for the first object based on a second indicia drawn from the first plurality of indicia. Visualization engine 512 may then determine a visual attribute for the first object based on a third indicia drawn from the first plurality of indicia. Visualization engine 512 may further compute a distance measure from the third object to the second object based on a first indicia drawn from the second plurality of indicia, compute a size measure for the second object based on a second indicia drawn from the second plurality of indicia, and determine a visual attribute for the second object based on a third indicia drawn from the second plurality of indicia. For example, a computed distance measure may represent a measure of priority pertaining to a client account in a CRM arrangement (as described below), the first object and second object for example being data objects representing individual client accounts, and the third object being a data object representing a portfolio comprising a number of individual accounts. According to such an arrangement, each client account object may be given a computed distance measure from the portfolio object, indicating their individual relevance or priority within the portfolio.

Further according to the embodiment, a visualization engine 512 may send, via a third communication adapter 515 and via network 501, the distance measure and size measure and visual attribute of the first object and the distance measure and size measure and visual attribute of the second object to a client visualization application (for example, a visual rendering software application operating on a client device, such as a user's mobile device), for use in forming graphical representations of data for viewing by a user. For example, visualization engine 512 may generate visual indicia and then provide generated indicia to a connected output device such as a computer monitor or a built-in display operating on a user's device (such as a smartphone display), where indicia may be visually presented for viewing.

Detailed Description of Prior Art

Figure 13:
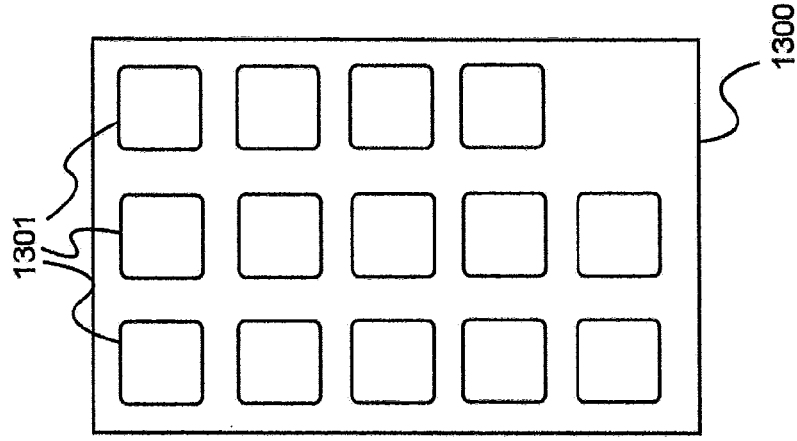
FIG. 13 is a prior art illustration of a tile-based user interface.

FIG. 13 is a prior art illustration of a tile-based user interface 1300. In such interface arrangements common in the art, a plurality of "tiles" or icons 1301 are displayed, each corresponding to a discrete portion of information (such as stored contact information for an individual), or a software application such as a game or other application, and are generally arranged in a grid-like format. Additional icons may be viewed by navigating to additional "pages" of interface 1300, for example by swiping (for example, using a touchscreen-enabled device) or by scrolling (for example, using a mouse or similar scrolling input device). Such arrangements are well suited to ordered graphical display of many elements, but they are inefficient in terms of screen space and user interaction, requiring additional steps to view the full extent of available information.

Figure 14:
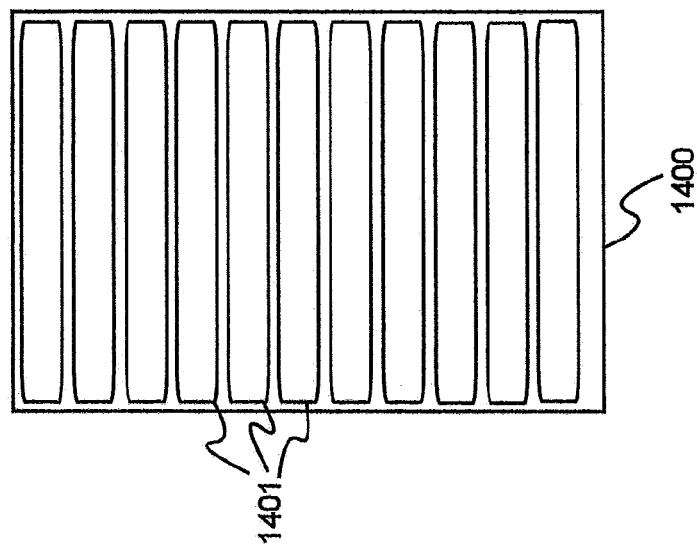
FIG. 14 is a prior art illustration of a list-based user interface.

FIG. 14 is a prior art illustration of a list-based user interface 1400. According to a list-based arrangement, a plurality of information or software applications are presented as a list of items 1401, generally arranged in a linear fashion and optionally allowing a user to view additional information by scrolling through the list. Such arrangements are suitable for presenting linear information such as time-based lists showing an order of events (for example, for viewing news articles or communication messages), but are less efficient in terms of both screen space and user interaction than even a grid-like arrangement described previously (referring to FIG. 13). To view more information a user must take additional steps to scroll through a list, and there may be little or no indication of position to indicate a user's current position in a list or the position of an information item they are searching for.

It may be further appreciated that both tile-based and list-based interface arrangements may be unsuitable for very small screens, as they rely on a degree of space in which to arrange information for display, and as the size of a display decreases the information may become more crowded or lose the relative indications of order or direction to provide necessary cues for a user to navigate the interface (for example, in a list-based interface, if a screen is only large enough to display a single item at a time, a user has no indication of what direction to scroll to view the rest of the list).

According to the embodiments disclosed herein, a planetary-model user interface may be used to present a variety of information to a user, addressing the shortcomings in the art through efficient and meaningful information layout. Rather than a traditional unidirectional or bi-directional tile-based or list-based arrangement, a planetary-model interface may display information in an amorphous structure, visualizing information or software applications as "planets", circular icons, or other discrete graphical indicia for identification. These indicia may be positioned arbitrarily about a center point, similar to arrangements of stars in a galaxy or planets in a solar system. Various visual cues may be used to identify information details without occupying additional screen space to describe them in text, for example identifying particular attributes such as recent activity or certain metricized progress or status measurements using visual cues such as size, color, shape, or physical arrangement of graphical indicia. For example, a software application that was used recently may be positioned close to a central point where, for example, a user's personal information may be presented as a unique graphical indicia to serve both as a quick and convenient way to view personal information (such as contact information or account details), as well as to serve as an "anchor" point to orient a user towards the center of an interface for rapid navigation or viewing. A planetary-model interface may also be suitable for rapid navigation, as a user may "zoom out" to view additional planets or other indicia, and then "zoom in" to a particular region to view the information they need, eliminating the need to incrementally scroll through a list or flip through pages of tiles. Additionally, a variety of "idle animation" may be utilized, causing indicia to move about while a user is viewing an interface. This may be used, for example, to cause indicia to "orbit" or slowly rotate about a central indicia, maintaining their relative positioning with one another (and thus preserving detailed information indicated by such visual cues, as described below), and allowing indicia to move into view on their own so that a user may not need to scroll or zoom to view all information available.

Detailed Description of Exemplary Embodiments

Figure 15:
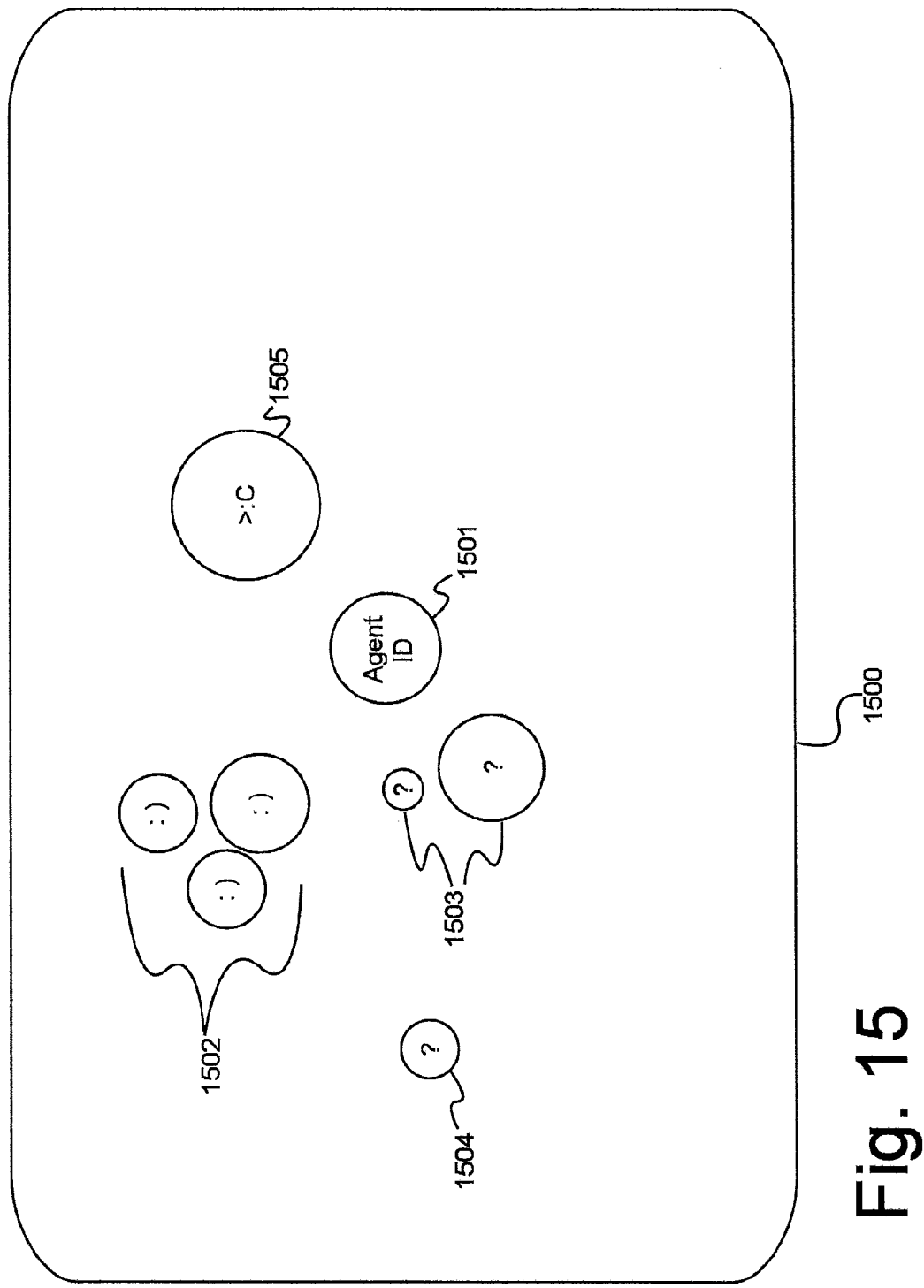
FIG. 15 is an illustration of an exemplary planetary model user interface for visualizing customer relations management data, according to a preferred embodiment of the invention.

FIG. 15 is an illustration of an exemplary planetary model user interface 1500 for visualizing customer relations management (CRM) data, according to a preferred embodiment of the invention. According to the embodiment, a CRM agent ID (such as their name or CRM program login data, or any other suitable means of identifying a particular agent) may be displayed as a central graphical indicia 1501, about which various other indicia may be arranged according to a planetary model. According to various alternate arrangements, additional or alternate information may be represented as a central indicia, for example a single account or client, or a particular product or service. In this manner, a variety of information may be used as a visual "center point" around which related information may be represented according to a planetary model. For example, a plurality of indicia 1502 may be displayed, each representing a single client or account for which an agent is responsible or with which they may be associated (for example, in a banking use case several agents may work together on a single account). According to the embodiment, a variety of visual cues may be displayed to indicate information details, for example as illustrated a graphical depiction of a customer's sentiment may be displayed, such as using a "smiling face" on indicia 1502 to indicate positive sentiment or happy customers, or an "angry face" on indicia 1505 to indicate a dissatisfied customer. Indicia 1503, 1504 may be displayed with additional visual identifiers, for example, to indicate a prospective client (as illustrated here using a question mark). Additionally, as described previously each additional indicia displayed may in turn be used as a central or "anchor" indicia, about which other indicia may be arranged. For example, in a CRM arrangement according to the embodiment, individual clients may be indicated (for example using visual cues such as color), and if a user "clicks" or otherwise interacts with a client, individual accounts or cases associated with that particular client may be displayed arranged about a central indicia corresponding to the client as a whole (such as a corporate or account ID, for example). In this manner, a large number of indicia may be easily accessed and arranged as a form of "nested" planetary models, for example where a coarse summary is initially displayed arranged about a central indicia, and upon further interaction another indicia may be selected for central use and new indicia may be displayed or existing indicia may be rearranged about the new central indicia.

According to the embodiment, graphical indicia may be rearranged or modified in a "live" or "real time" manner, for example while a user is actively viewing a visualization interface. For example, according to a CRM arrangement, if a user is viewing an interface while a client makes a purchase, a graphical indicia representing that client's account may be updated immediately during viewing—such as, for example, repositioning their indicia closer to center (to indicate recent activity), or increasing the size (to indicate a greater value now that they have purchased an additional product). In this manner, information may be updated continuously without disrupting other information or a user's view, something that is not possible in traditional visualization arrangements using tiles or lists.

A variety of additional visual cues may be utilized to indicate detailed information, such as using positioning to indicate relevancy information. According to the embodiment, indicia may be placed closer to an agent's central indicia 1501 to indicate clients or information that was recently interacted with, for example a plurality of indicia 1503 indicating recent, prospective clients. Indicia 1504 may be placed further away to indicate less relevance, for example a prospective client that has not returned a call in some time, or that expressed only a low level of interest as would indicate that they are less likely to become customers. Other visual cues may include varying the size or shape of a plurality of indicia, for example using an enlarged indicia 1505 to indicate a high-value customer such as one with a large account balance or a large number of subscriptions (or other indicators or metrics of account value, according to a particular use case), or varying a color or other visual cue for a plurality of indicia, such as to indicate the nature of information represented (for example, using a green outline to indicate corporate clients, or a shaded icon to indicate suspended accounts, or other such visual cues). In this manner, a "multi-factor" visualization of information may be provided through the use of various non-conflicting visual cues, such as size, color, text, graphic-based identifiers, animations, proximity, or absolute position. This may make a complex view of information easily digestible for a user, and easily displayed in a compact visual form-factor, such as for use on devices with small screens or limited resources.

Visual cues may also be utilized to provide notifications, for example causing an indicia to "blink" or "pulsate", or otherwise visually indicate that attention may be required. This may provide an interactive information viewing and notification system without requiring a user to view additional software interfaces or applications, as may be required in various traditional arrangements (for example, "push" notifications on a mobile device that open a particular software application to allow a user to respond). Indicia may also be grouped relatively close to one another to indicate association, for example a plurality of indicia 1502 may be arranged close to each other to indicate related customer accounts, for example a family account or a number of individual accounts associated with a single corporate client.

It should also be appreciated that by grouping indicia according to the invention, either by physical arrangement (such as with indicia 1502) being grouped relatively close to one another), or by visual cues (such as using a particular color to indicate related accounts), various information types or categories may utilize distinct sets of rules or configuration for display. For example, one set of information may display using proximity to a central indicia 1501 to indicate how recently the account holder was contacted, while another set may utilize proximity to indicate how long the account has been open. In this manner, a wide variety of information may be presented in a unified, consistent manner that is efficient and easily understood by a user, and the specific nature may be configured to suit their particular needs or preference.

Another exemplary use case for a planetary-model interface according to the invention, may be that of managing a law firm (or other similar client-oriented firm). Various indicia may be displayed to represent individual clients or cases, and visual cues may be used to indicate internal management information such as time tracking ("how many hours have we spent on this client this week?") or cost management ("how much have we spent pursuing this case?"). By varying visual cues used in the display of indicia, a variety of information may be indicated easily and in a very space-efficient manner, suitable for minimal user interaction (as the information is already available in a display without additional action to reveal further details) and appropriate for small screens such as for a mobile or wearable device, or for use in a small program window suitable for display alongside a number of other windows during work activities without impacting productivity.

Figure 6:
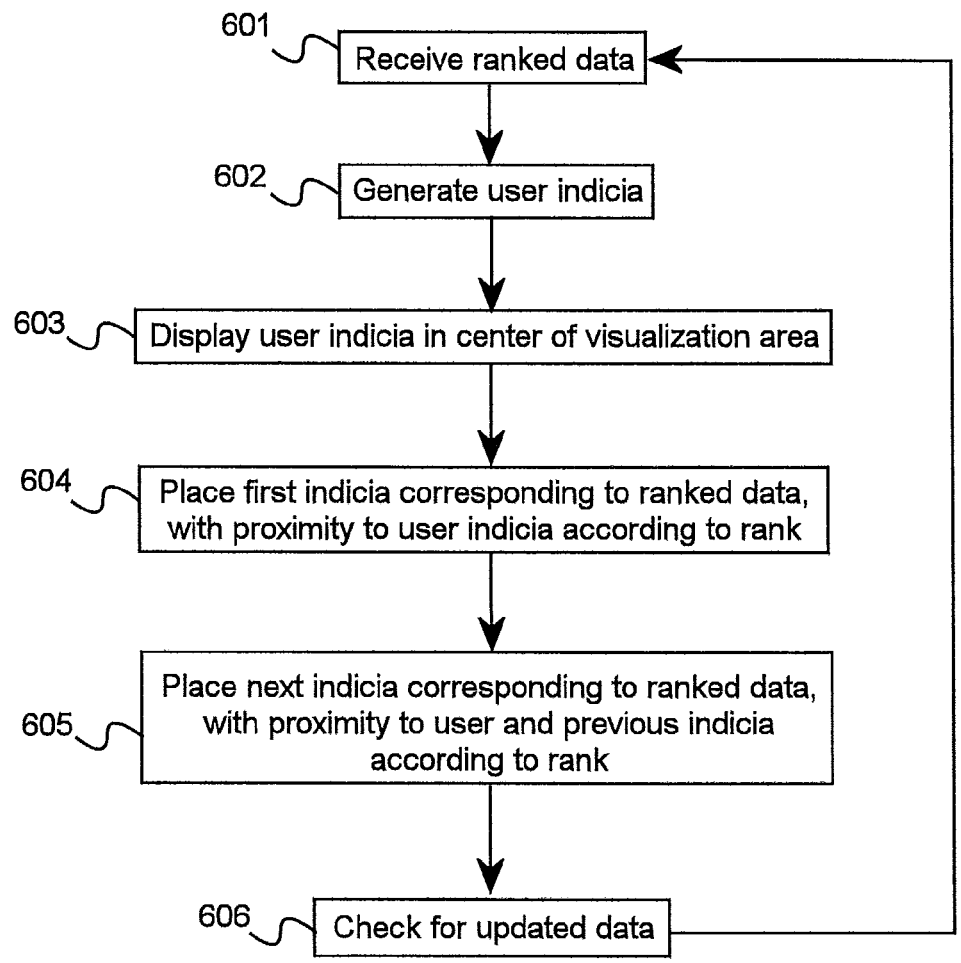
FIG. 6 is a method flow diagram illustrating an exemplary method for visualizing aggregated user activity data according to a planetary model.

FIG. 6 is a method flow diagram illustrating an exemplary method 600 for visualizing aggregated user activity data according to a planetary model. In an initial step 601, a visualization engine may receive a plurality of ranked data (for example, provided by a prioritization server as described previously, referring to FIG. 5). In a next step 602, a graphical indicia (such as in icon or image) may be generated, corresponding to a user. For example, an indicia may comprise user's initials may be used to form a small identifying indicia, or an image-based avatar selected from a preconfigured library or of a user's own choosing. In a next step 603, the user indicia may be displayed in the center of a visualization area such as a program window on a user's device. In a next step 604, a graphical indicia corresponding to a first portion of the received ranked data (for example, an icon representing a contact such as a friend or family member) may be displayed, positioned with a proximity to the user indicia based at least in part on the information's rank within the body of received ranked information. For example, high-ranked information may be placed in close proximity to a user's indicia, while lower-ranked (generally indicating less relevant or less recent) data may be displayed at a further proximity. In a next step 605, a next graphical indicia corresponding to a next portion of ranked data (for example, another contact) may be displayed, with proximity based on the data's ranking relative to both the user indicia and any previously-displayed indicia corresponding to ranked data. In this manner it can be appreciated that each new graphical indicia displayed may be positioned such that its proximity to other indicia may be generally indicative of their relative ranking. For example, a number of contacts stored on a user's device may be displayed with relative proximity to one another based on how recently they were communicated with, indicating not only an overall relevance (as determined by the proximity to a user's own indicia in the center of the visualization), but also a comparative relevance between each of a plurality of displayed ranked indicia (as indicated by their proximity to one another). In a final step 606, the visualization engine may check to see if any updated data has been received, and continue a visualization process in a looping fashion as illustrated, facilitating a "live" or continually-updating visualization of data. In this manner, a visualization and all displayed data may be kept current, ensuring that the apparent relevancy information is indicative of current data or activities.

Figure 7:
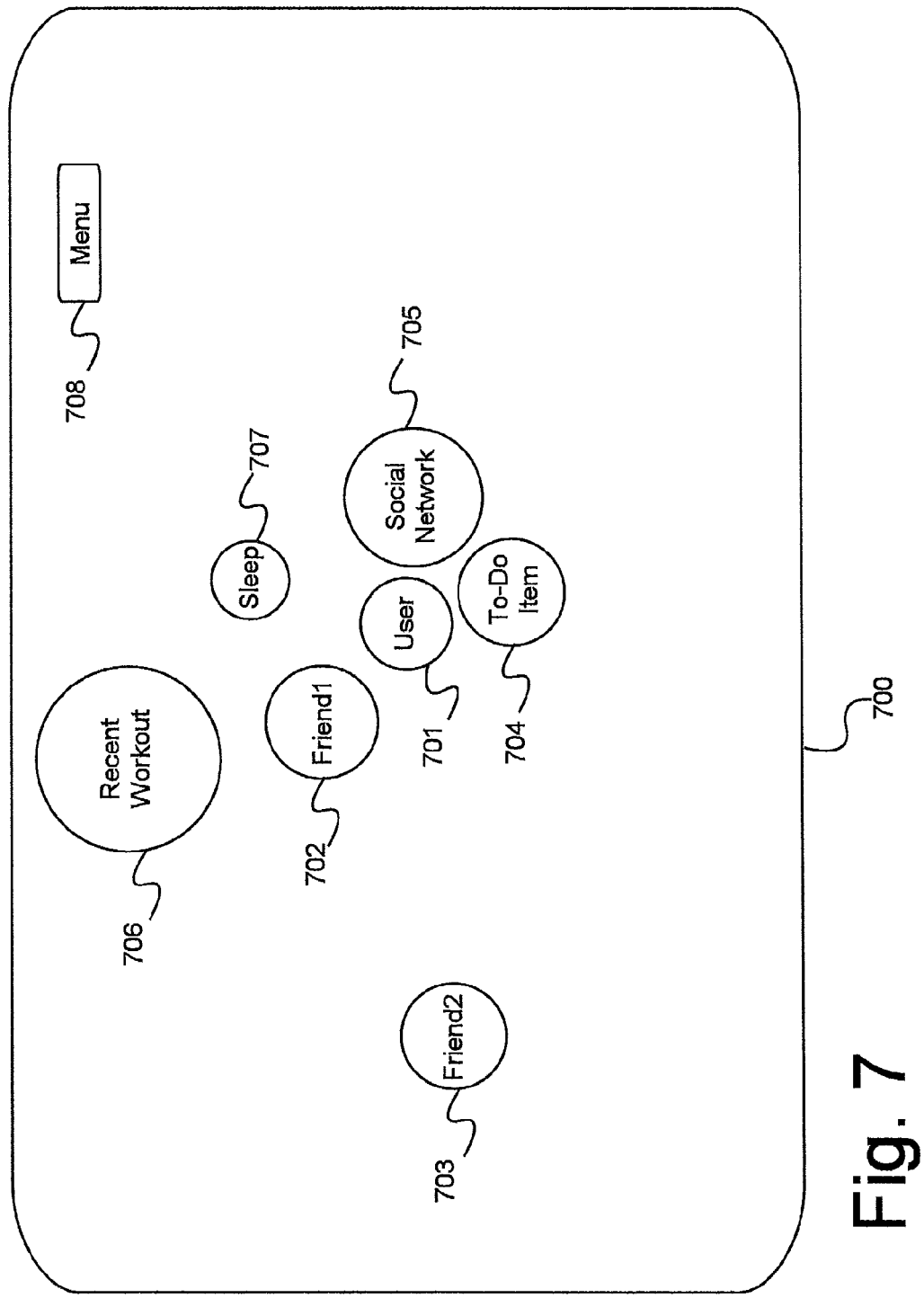
FIG. 7 is an illustration of an exemplary planetary model user interface for visualizing user activity data, according to a preferred embodiment of the invention.

FIG. 7 is an illustration of an exemplary planetary model user interface 700 for visualizing user activity data, according to a preferred embodiment of the invention. According to the embodiment, a graphical indicia corresponding to a user 701 may be displayed, having a generally central location within a visualization. The user indicia may correspond to a user's contact information (such as their name or phone number, as may be appropriate when operating on a smartphone or other mobile device), or a particular account belonging to the user (such as an email account, or their preferred social network account, for example their FACEBOOK™ login as is commonly used across a variety of software applications for user identification). A variety of exemplary additional graphical indicia that may be displayed, and associated information, is described below.

A variety of additional graphical indicia may be displayed about a user indicia 701, for example corresponding to a friend 702 or other contact (for example, contacts stored on a user's device). According to the embodiment, a contact 702 may be displayed with close proximity to user 701, indicating that they recently communicated. If communication occurred less recently, a contact 703 may be displayed further away from a user, indicating a lower relevancy. An approaching "to-do" 704 (such as a scheduled calendar event or reminder) may be displayed, with proximity indicating how far away the vent is. An event about to occur may be displayed immediately adjacent to user 701, while one that is far in the future may be displayed further away, making room for more immediate information displayed closer to user 701. A social network 705 may be displayed, and as illustrated may utilize additional visual cues to indicate more information, for example proximity to user 701 indicating how recently a user was active (for example; could also be used to indicate how recently a user received a private message, or was tagged in a photo, or other various social networking activities), while the size of indicia for social network 705 may indicate overall activity (for example, a larger indicia may indicate that they user posts frequently, or has a large number of followers). In this manner, it may be appreciated that a variety of visual cues may be utilized to make information immediately available to a user, facilitating rapid "glanceable" interaction with a visualization to quickly assess the information presented. Data from a fitness tracker (such as a wearable fitness tracking device or an integral hardware tracker operating on a user's device) may be displayed in a similar manner, for example a recent workout 706 may be displayed with proximity indicating how long it has been since the workout was finished, and size of indicia indicating the intensity or duration of the workout (for example). Various alternate fitness or health metrics may be visualized, such as sleep tracking 707 that may be displayed with proximity indicating how long it has been since the user last slept, and size of indicia indicating the duration or restfulness of their last sleep.

Additionally, a plurality of non-visualization indicia may be displayed, such as an interactive button 708 or other indicia for a user to interact with and operate a software menu, for example to configure a visualization being shown (such as to select colors, or to select what information is shown in a visualization). In this manner a visualization may be configurable to suit a user's specific needs, for example if they wish to focus on communication rather than fitness monitoring, they may choose to exclude fitness data and display more detailed contact information or communication options. Indicia corresponding to visualized data may also be interactive according to a particular arrangement or use, for example to enable a user to click, tap, or otherwise interact with indicia corresponding to a contact in order to send them a message (or call them, or other communication methods).

It should be appreciated that while reference is made to particular visual cues such as the size of a particular indicia, a variety of additional or alternate visual indicators may be utilized according to the invention. For example, a user may configure visualization to utilize color rather than size (for example, to economize screen space for a small display), or to utilize specific types of indicia such as initials (as may be appropriate for indicating contacts), or icons (as may be appropriate for indicating apps, as they may already have icons for display on a user's device). Another exemplary visual cue may be grouping or clustering of indicia to indicate categorization or other similarity between data. For example, a plurality of fitness tracking data may be grouped together around a central indicia, for example a recent workout or daily step tracking count.

In this manner a visualization may present a wide variety of relevant information to a user in an easily digestible format. A user may quickly glance at a visualization on their display (for example, on a window displayed on a computer display monitor) and readily process relevant information without having to navigate through unnecessary information or interfaces to find it. The use of a central indicia for the user and relevance-based proximity around it is well suited to the natural human tendency to process information outward from a starting point, and using a central user indicia provides a consistent starting point from which to begin.

Additionally, by utilizing proximity or relative positioning of indicia rather than connections between data indicia (as may be used according to other data visualization implementations, particularly those adapted to visualizing groups of users or contacts), information may be preserved when scaling a visualization display. For example, if a user "zooms in" on a display to view more detailed information, or "zooms out" to view a broad overview of available information, the relative positioning of indicia is preserved and no relevancy information is lost in the scaling. Additionally, this makes a planetary model according to the invention particularly suitable for small displays, such as on a mobile device (such as a smartphone or tablet computing device), or a smartwatch such as the APPLE WATCH™, where a key usability factor is efficiency of data presentation. A visualization may be scaled-down to fit a smaller screen without loss of information, due to the use of relative positioning to indicate information, rather than an absolute positioning approach. Such a relative approach according to the invention also enables movement of indicia, for example data may "orbit", rotate, or otherwise move about while maintaining relative proximity to a user indicia or to other data indicia, facilitating a fluid display without losing or obscuring information being represented. For example, a user may rearrange indicia or configure a degree of idle movement, such as indicia slowly moving about their central user indicia.

Figure 8:
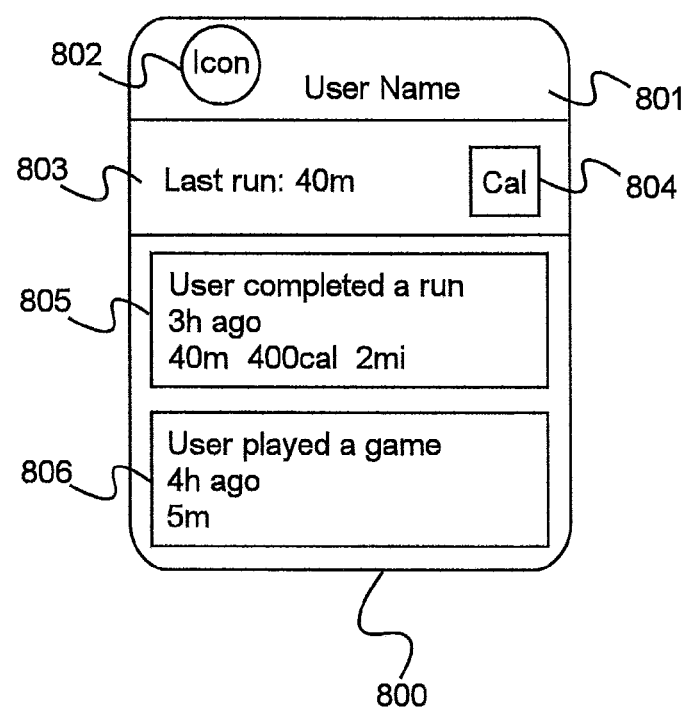
FIG. 8 is an illustration of an exemplary graphical interface for viewing user information.

FIG. 8 is an illustration of an exemplary graphical interface 800 for viewing user information. As illustrated, a graphical interface 800 may display a user's name 801 or other identifying information (for example, a unique but arbitrary "screen name"), optionally with an icon 802 such as a personal photograph or "avatar" that may be used to graphically identify a user. A variety of summarized information particular to the user may be presented, such as recent fitness activity 803 or other configurable information, providing the user with a quick and concise view of information of their choosing. For example, a user may wish to focus on fitness data (as illustrated), or they may wish to concentrate on gaming performance and choose to display summarized game session information. A plurality of interactive indicia may also be presented, such as an interactive button 804 to view a user's calendar (as described below in greater detail) or other additional information, allowing a user to view additional or alternate information, or in greater detail, as appropriate without needing to have the information always presented (and thus complicating a summary view with information that may not always be desired). Additionally, a plurality of discrete user-related "events" or data summaries may be presented, for example summarizing a recent workout 805 or a recent gaming session 806. Discrete events displayed in this manner may be presented with a variety of associated detailed information, such as fitness metrics (as illustrated, indicating that the user ran 2 miles in 40 minutes, burning 400 Calories) or game performance (as shown, indicating the user played a game for 5 minutes). It should be appreciated that a wide variety of information may be presented in this manner, and details displayed with events may vary according to the nature of the particular data being presented or according to the nature of a particular data source. For example, some fitness trackers may provide detailed step-counting data, while others may provide heart rate measurements.

FIG. 16A illustrates a calendar view 1600 that may be utilized to view information or events by day, for example when a user clicks on a calendar icon 804 (referring to FIG. 8, above) or other such interaction to select a calendar view. Calendar view 1600 may display interactive indicia 1602 to enable a user to change how data is viewed (for example, to select from "view by day" or "view by month"), as well as a brief summary of displayed information 1603 (such as a monthly summary while viewing detailed information by day, for example). For example, calendar view 1600 may rearrange indicia 1601 with a focus on time-based information, such as indicating a specific date on indicia 1601 corresponding to the day an event occurred or the last time information was viewed. For example, when viewing fitness tracking information, indicia 1601 may be displayed with date indicated, and visual cues may be used to indicate activity on each day such as (for example) filling in a portion of a circle or other indicia to indicate progress toward a fitness goal (such as minutes run or steps climbed, for example).

FIG. 16B illustrates a calendar view 1600 that may be utilized to view information by month. Calendar view 1600 may be used to present summarized information on a per-month or even per-year basis (or any other arbitrary interval of time, as may be configured by a user to suit their preference), such as grouping information and displaying by month 1604 as shown. Calendar view 1600 may (for example) use size of indicia 1605 to indicate an overall summary of "how much this activity was performed this month". In this manner a user may quickly view time-based summarized information, and then switch back to a planetary view without disrupting information available, or a particular arrangement or other visual cues.

Figure 9:
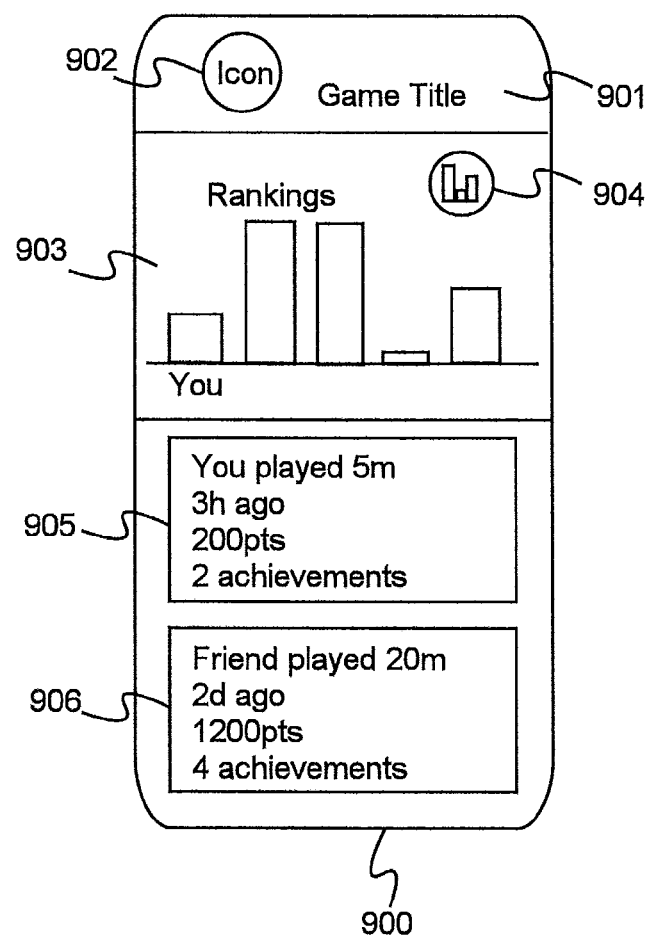
FIG. 9 is an illustration of an exemplary graphical interface for viewing game activity information.

FIG. 9 is an illustration of an exemplary graphical interface 900 for viewing game activity information. As illustrated, an interface 900 may present a game title 901, optionally with a game's program icon 902 or other graphically-identifying indicia that may be unique to a particular game for rapid identification. A plurality of ranking data 903 may be presented, for example to indicate a user's performance in a game as compared to their friends or other known players (for example, top-ranking players). Interactive indicia 904 may be provided, for example an interactive button to allow a user to alter displayed rankings (for example, to see a comparison of their performance and that of high-ranking players), or to otherwise alter displayed information. For example, a user may wish to remove ranking information and instead display detailed game-specific metrics, such as "gold collected" or "achievements earned", or other various information according to the nature of a particular game or a user's preference. Additionally, a plurality of discrete events or other summarized information may be displayed, for example an event 905 indicating a user's last game session or an event 906 indicating a friend's last game session. In this manner, information may be rapidly viewable as a summary, or a user may choose to view in greater detail as needed, such as to view detailed performance information on a friend's last gaming session and see how they are competing.

Figure 10:
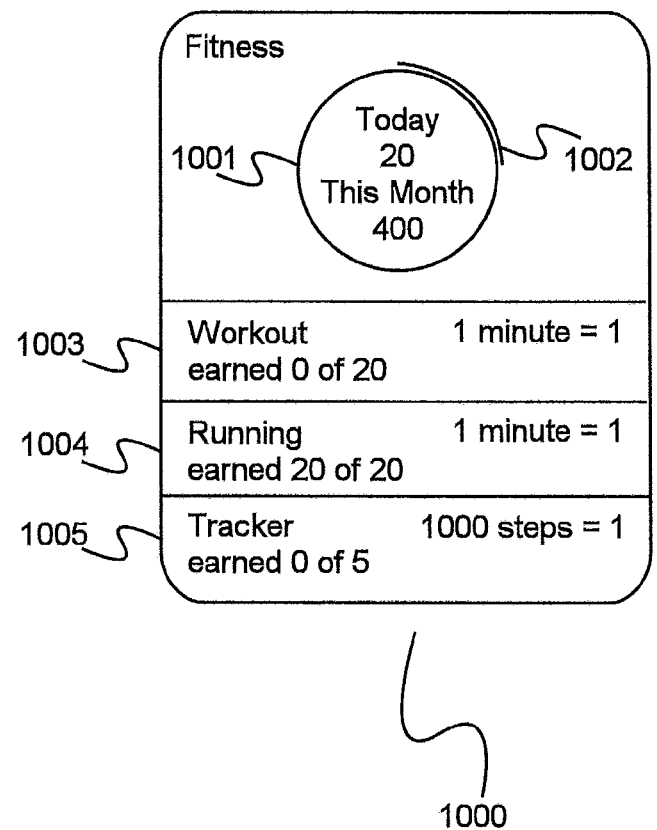
FIG. 10 is an illustration of an exemplary graphical interface for viewing fitness information.

FIG. 10 is an illustration of an exemplary graphical interface 1000 for viewing fitness information. As illustrated, a user's fitness information may be presented as a quick summary 1001, optionally with a variable indicator 1002 of a current metric (for example, to indicate how many minutes they have spent working out so far today). Information displayed as a summary may be configurable by a user to suit their preference, for example one user may wish to focus on running performance while another may instead choose to focus on cycling. In this manner a user may summarize information that is particularly relevant to them, providing personalized tracking while maintaining a consistent user experience. A plurality of additional detailed fitness information may be displayed, for example to indicate specific goals or achievements a user may be working toward. For example, a user's current progress toward a workout goal 1003, running goal 1004, or information measured by a fitness tracker 1005 such as a FITBIT™ (for example) may be shown. As illustrated, such detailed goal-oriented information may be presented with an indication of "what is being measured", for example for a run 1004 it may be indicated that each minute spent running grants a user "1 point" toward their goal. In this manner a user's progress toward a variety of goals may be monitored and presented, enabling them to view a variety of different fitness or health information in a consistent and concise way.

FIG. 11 is an illustration of an exemplary graphical interface 1100 for viewing social network information. As illustrated, a social network (such as FACEBOOK™ or TWITTER™, for example) may be presented as a series of discrete events 1101, each of which may correspond to a user post or content submission. For example, activity from a user's contacts within a social network (for example, other users they have added to a "friend" list within a social networking service, regardless of whether they are known outside of a particular social network) may be shown, such as when a friend posts a comment or submits a photograph. A plurality of interactive indicia 1102 may be presented, for example to enable direct interaction within the context of a particular social network. For example, a user may view a comment posted by a friend and be presented with an interactive button 1102 to allow them to post a comment in response, without leaving a social networking view or having to locate the friend's contact information. In this manner a user may view and act upon contextual information, providing the ability to respond directly to information as it is viewed.

FIG. 12 is an illustration of an exemplary graphical interface 1200 for viewing contact information. As illustrated, a contact's name 1201 (for example, their actual name or a unique username or "screen name") may be displayed, optionally with a photo 1202 or icon to graphically identify the contact, for example a picture of them or a unique user "avatar". A plurality of interactive indicia 1203 may be presented, for example to enable a user to directly communicate with a contact being viewed without having to open a separate application or interface "window". The quantity, arrangement, or nature of such indicia may vary according to a contact's information, for example if particular communication methods are unavailable (for example, if a user has not stored the contact's phone number) a corresponding indicia may be omitted. In this manner a user may easily communicate with contacts according to their particular communication preferences. Additionally, a plurality of discrete events or other information associated with a particular contact may be displayed, for example indicating a friend's recent social network activity 1101 (for example, the last comment them they posted) or a recent gaming session 1204 (for example, indicating summarized game performance information). Additional interactive indicia may be displayed according to the nature of information presented, such as an interactive button 1102 to enable a user to respond to a contact's social network post or comment. In this manner, a variety of information associated with a particular contact may be viewed in a unified interface 1200 with the contact's personal information, along with interactive means to communicate with the contact according to the information available (such as their communication preferences, contact information, or recent activity).

It should be appreciated that the arrangements of interface elements described above are exemplary, and various alternate or additional arrangements may be utilized according to the invention such as by adding, removing, or repositioning elements such as icons, text fields, borders, or other elements, for example to adapt an interface displayed for a particular purpose (such as a specific software application or social networking service, for example).

The skilled person will be aware of a range of possible modifications of the various embodiments described above. Accordingly, the present invention is defined by the claims and their equivalents.

What is claimed is:

1. A system for automated multifactor prioritization and visualization, comprising:

a network-connected computing device comprising at least a memory, a processor, and a plurality of programming instructions, the plurality of programming instructions, when operating on the processor, causing the processor to:

instantiate a data aggregation server software module configured to receive a plurality of electronic data elements via a network pertaining to a plurality of objects, and configured to generate, for each object, an aggregate of data elements pertaining to the respective object;

instantiate a prioritization server software module configured to receive a plurality of aggregates of data elements from the data aggregation server, each aggregate of data elements corresponding to a specific object of the plurality of objects, and to prioritize at least a portion of the objects into a hierarchical ordered list of prioritized objects, the prioritization of each object based on the respective aggregate of data elements; and instantiate a visualization engine software module configured to produce a plurality of graphical indicia for display on a video output device, the plurality of graphical indicia corresponding to at least a portion of the prioritized objects the plurality of graphical indicia is visually arranged about a centrally-positioned graphical indicia corresponding to a user of the computing device;

wherein at least more than one of the plurality of graphical indicia corresponding to at least a portion of the prioritized objects represent contacts of the user, and at least one of the plurality of graphical indicia corresponding to at least a portion of the prioritized objects represents an activity of the user, and at least one of the contacts relates to the user by a communication to or from the user;

wherein an arrangement of graphical indicia arranged about the centrally-positioned graphical user indicia rotates about the centrally-positioned graphical user indicia.

2. The system of claim 1, wherein, for each graphical indicia, a distance from the centrally-positioned graphical indicia represents a priority of the respective object and further attributes of the respective object are represented by further graphical attributes comprising size, color, and shape.

3. The system of claim 1, wherein a distance between a first and a second non-central graphical indicia is determined by a degree of relatedness between the corresponding first and second objects.

4. The system of claim 1, wherein a notification of an event pertaining to one of the objects is provided to the user by fluctuating the size of the graphical indicia corresponding to the respective object.

5. A method for visualizing aggregated user data according to a planetary model, comprising the steps of receiving, at a visualization engine, a plurality of ranked electronic data aggregates pertaining to a plurality of prioritized objects;

displaying, on a video output device in communication with the visualization engine, a centrally-positioned graphical user indicia corresponding to a user;

displaying a plurality of graphical indicia corresponding to at least a portion of the prioritized objects;

wherein at least more than one of the plurality of graphical indicia corresponding to at least a portion of the prioritized objects represent contacts of the user, and at least one of the plurality of graphical indicia corresponding to at least a portion of the prioritized objects represents an activity of the user, and at least one of the contacts relates to the user by a communication to or from the user;

wherein an arrangement of graphical indicia arranged about the centrally-positioned graphical user indicia rotates about the centrally-positioned graphical user indicia.

6. The method of claim 5, wherein, for each graphical indicia, a distance from the graphical user indicia represents a priority of the respective object and further attributes of the respective object, drawn from the respective data aggregate, are represented by further graphical attributes comprising size, color, and shape.

7. The method of claim 5, wherein a distance between a first and a second graphical indicia is determined by a degree of relatedness between the corresponding first and second objects.

8. The method of claim 5, further comprising the step of providing a notification to the user of an event pertaining to one of the objects by fluctuating the size of the graphical indicia corresponding to the respective object.

* * * * *